United States Patent
Paharia

(10) Patent No.: US 9,779,421 B2
(45) Date of Patent: *Oct. 3, 2017

(54) METHOD AND SYSTEM FOR EMBEDDING A PORTABLE AND CUSTOMIZABLE INCENTIVE APPLICATION ON A WEBSITE

(71) Applicant: Bunchball Inc., Redwood City, CA (US)

(72) Inventor: Rajat Paharia, Redwood City, CA (US)

(73) Assignee: Bunchball Inc., Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,628

(22) Filed: May 19, 2014

(65) Prior Publication Data
US 2014/0257992 A1    Sep. 11, 2014

Related U.S. Application Data

(63) Continuation of application No. 11/879,580, filed on Jul. 18, 2007, now Pat. No. 8,768,764.

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0207* (2013.01); *G06Q 30/0226* (2013.01)

(58) Field of Classification Search
USPC ............ 705/14.27, 14.39, 14.31, 14.32, 14.1
See application file for complete search history.

(56) References Cited

U.S. PATENT DOCUMENTS

| | | | | |
|---|---|---|---|---|
| 6,574,606 B1 * | 6/2003 | Bell | ...................... | G06Q 30/02 705/14.27 |
| 7,831,928 B1 * | 11/2010 | Rose | .................. | G06F 17/3089 715/733 |
| 2002/0113820 A1 * | 8/2002 | Robinson et al. | ............ | 345/764 |
| 2002/0178255 A1 * | 11/2002 | Hobart | .................. | G06Q 30/02 709/224 |
| 2004/0153378 A1 * | 8/2004 | Perkowski | ........ | G06F 17/30879 705/27.2 |
| 2005/0192863 A1 * | 9/2005 | Mohan | ............................ | 705/14 |
| 2006/0143236 A1 * | 6/2006 | Wu | ............................. | 707/104.1 |
| 2006/0206376 A1 * | 9/2006 | Gibbs | .................. | G06Q 30/02 705/14.13 |
| 2007/0061447 A1 * | 3/2007 | Flores | ................. | G06F 11/3419 709/224 |
| 2007/0130150 A1 * | 6/2007 | Fowler | .................. | G06Q 10/00 |

(Continued)

OTHER PUBLICATIONS

Paharia, Rajat. http://seven.pairlist.net/pipermail/casual_games/2005-October/000368.html Oct. 2005.*

(Continued)

*Primary Examiner* — Luis A Brown
(74) *Attorney, Agent, or Firm* — Sheppard, Mullin, Richter & Hampton LLP

(57) ABSTRACT

An embodiment of the present invention is described that includes an incentive application for providing incentives to a visitor of a site. The incentive application is both portable onto other sites and is customizable on each site to the information provided on the site.

22 Claims, 21 Drawing Sheets

(56) References Cited

U.S. PATENT DOCUMENTS

| | | | |
|---|---|---|---|
| 2007/0184902 A1* | 8/2007 | Liu | A63F 13/12 463/42 |
| 2007/0218984 A1* | 9/2007 | Yang | A63F 13/12 463/29 |
| 2008/0168099 A1* | 7/2008 | Skaf | G06Q 30/02 |
| 2009/0007092 A1* | 1/2009 | Wolfe | G06F 9/54 717/173 |

OTHER PUBLICATIONS www.IMVU.com "Add Flash Games to your Homepage." Mar. 7, 2006.*

"Ultimate Baseball Online Adds Virtual Trophy Case," http://www.lockergnome.co/nexus/game/2006/12/05/ultimate-baseball-online-adds-virtual-trophy-case, Jan. 12, 2007.

Arrington, Michael, "Embed Flash Games in Your Blog," www.techcrunch.com, Feb. 5, 2006.

Business Wire, "Six Apart Launches Open Widget Platform for Type Pad Blogs," Mar. 30, 2006.

Cashmore, Peter, "MySpace Games from Bunchball," www.mashable.com, Feb. 20, 2006.

Gamasutra, "Game Trust's Greechan Talks Captivating Casual Garners," http://www.gamasutra.com/php-bin/news_index.php?story=13668, Brandon Boyer, Apr. 25, 2007.

Gametrust, "Game Trust Announces New Captivate System—New Technology Supports Site-Wide Meta-Games and Affinity Programs," http://www.gametrust.com/cms/?q=node/479, Feb. 8, 2007.

Paharia, Rajat, et al., Google Groups "BunchBall" postings, Mar.-Nov. 2006.

Perez, Juan Carlos, "Web 2.0 Spotlights Risks, Opportunities on the Internet," Info World Daily, Oct. 5, 2005.

Sarno, David, "Stickam in the L.A. Times," www.stickam.com, Jan. 28, 2007.

* cited by examiner

METHOD AND SYSTEM FOR EMBEDDING A PORTABLE AND CUSTOMIZABLE INCENTIVE APPLICATION ON A WEBSITE

CROSS REFERENCE TO RELATED APPLICATIONS

This is a Continuation Application of U.S. patent application Ser. No. 11/879,580, filed Jul. 18, 2007, entitled "Method and System for Embedding a Portable and Customizable Incentive Application on a Website," which is hereby incorporated by reference herein.

FIELD

The present invention, generally relates to the field of providing incentive applications on a data network, and more particularly, to a method and system for embedding an incentive application between a first site and a second site on the data network.

BACKGROUND

E-commerce over the Internet still relies heavily on attracting visitors to a website. Revenue from websites is primarily driven from the number of visitors who visit a website that either (i) purchase a product or service offered on the website or (ii) generate advertising dollars from advertisers on the website that pay per visitor to a website. In the past, websites have attracted visitors to their sites by offering incentives for visiting websites such as airline miles offered by airline companies or sweepstakes entries to visitors of sites, to name a few.

The problems with the incentives being currently offered by websites are two-fold. First, each website must independently develop the incentive software program either internally or have a third-party vendor write the software code to offer the incentive on their particular website. There is no universally portable incentive application available today that can be used on any website. Second, current incentives offered on websites are written specifically for a particular websites and are not easily customizable once written. Further customization requires additional expense and time for the website owner.

A need therefore exists for an incentive application that is both portable and customizable.

SUMMARY OF THE INVENTION

An embodiment of the present invention is described that includes an incentive application for providing incentives to a visitor of a site. The incentive application is both portable onto other sites and is customizable on each site to the information provided on the site. Alternative embodiments describe an API providing incentives to a visitor site.

A further embodiment of the present invention is described that includes a computer-implemented system for embedding a portable incentive application on a first site. The system includes, in this embodiment, a data network, a first site in communication with the data network where the first site displays first site offerings. The system further includes, in this embodiment, a second site in communication with the data network and the first site. The second site includes the portable incentive application that is an application embedded in the first site from the second site, in this embodiment. The portable incentive application generates incentives for viewing the first site.

In a further embodiment, a method for embedding a portable incentive application on a first site includes providing a data network, providing a first site in communication with the data network where the first site displays first site offerings. Then, embedding from a second site, in this embodiment, a portable incentive application on the first site where the portable incentive application is an application.

In a still further embodiment, a computer-readable medium and an electronic signal containing computer instructions for embedding a portable incentive application is described that performs the method described above.

DETAILED DESCRIPTION

Figure 1:
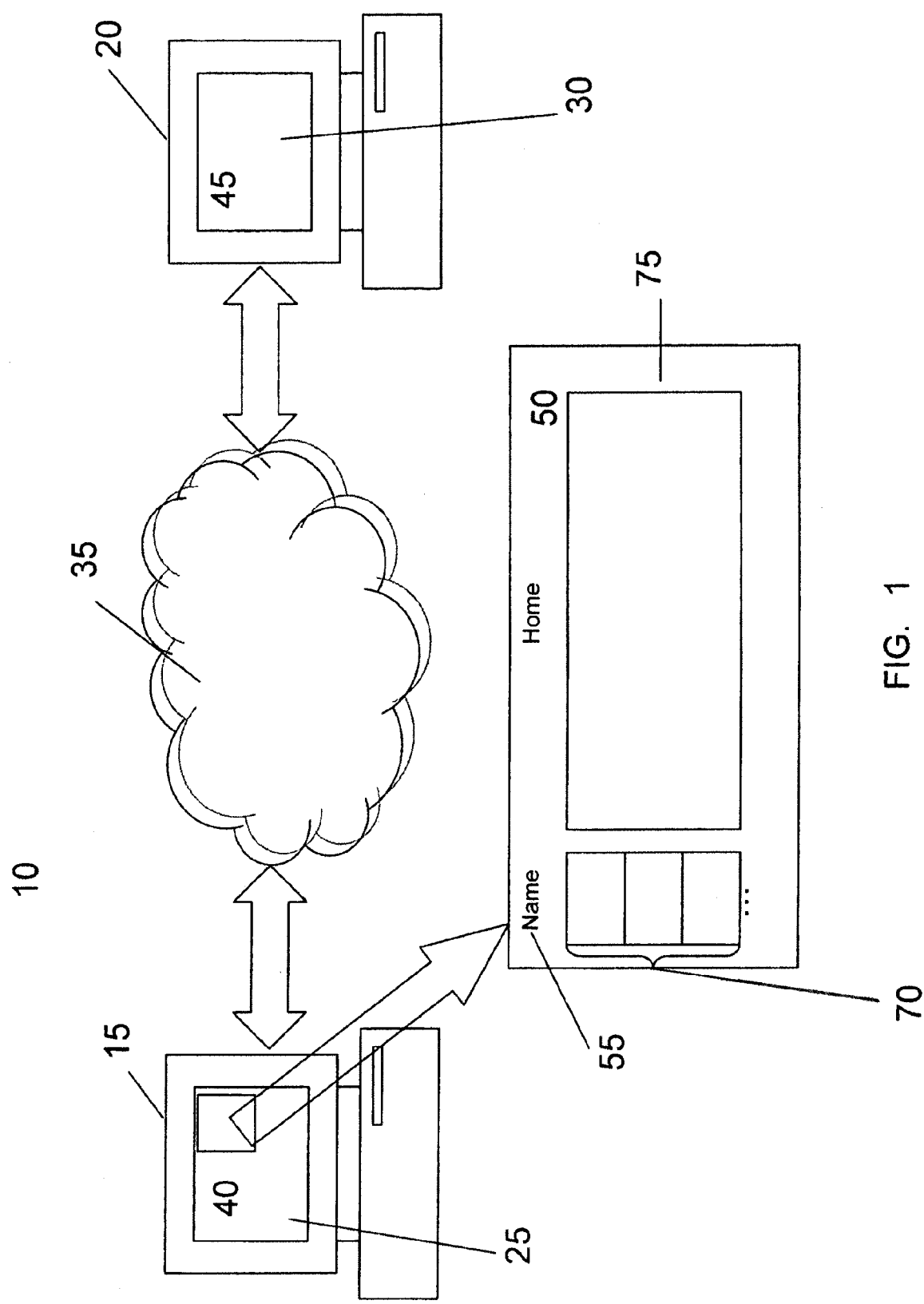
FIG. 1 is a block diagram view of an embodiment of the system of the present invention.

FIG. 1 is a block diagram view of an embodiment of the system of the present invention. In FIG. 1, an embodiment of the system 10 is shown having a first computer system 15 in communication with a second computer system 20. Each of the first computer system 15 and the second computer system 20 may be one or more computers, servers, processors or the like as is generally described with regard to the general computer system of FIG. 21 below. Each of the first computer system 15 and the second computer system 20 contain a respective display screen 25 and 30. The first computer system 15 and the second computer system 20 are in communication through a data network 35 that transmits data between the two computer systems. In one embodiment, the data network is the world-wide web or Internet. In other embodiments, the data network may be any two computer systems transferring data with one another, including a local area network (LAN), a wireless LAN, or other known data networks. Displayed on the first computer system screen 25 is a first site 40. The first site 40 is, in one embodiment, an Internet website. The first site 40 displays first site offerings that may include any goods, services or information that are provided to a viewer from any website. For purposes of clarity, it is understood that the first site 40, in this embodiment, may be any website that offers any goods, services, or information to a viewer. The first site 40 need not charge any fee for the goods, services or information being provided to a viewer. In this embodiment, the goods, services or information being provided, with or without a fee, is defined as the first site offerings. Also as part of the system 10 is the second computer system 20 that is in communication with the first site 40. On the second computer system screen 30 is a second site 45 that, like the first site 40, is, in one embodiment, an Internet website. Provided on the second site 45 is a portable incentive application that generates an incentive screen 50 on the first site 40 to provide incentives to the viewer of the first site 40 for visiting and interacting with the first site 40. It is understood that there are alternative embodiments that need not generate a user interface in the first site 40 (i.e. incentive screen 50), but rather the second site 45 provides an application program interface (API) (in lieu of a portable incentive application) with a set of routines, protocols and tools for obtaining the necessary data and functions from the second site 45 to perform the function described herein by the portable incentive application. In this embodiment, the actual portable incentive application itself need not generate the incentive screen in the first site 40, but rather an API is provided on the first site 40 that calls out routines or data from the second site 45 as needed. In this way, the first site 40 need not provide the data and functions of the portable incentive application from its own site but rather uses the API to retrieve the needed information from the second site 45. It is understood throughout this application that the functions and data provided by the portable incentive application as described in one embodiment can be provided, in another embodiment, by an API as described above. It is further understood that the embodiments may also be used in combination. The portable incentive application is a software application that is written in any programmable software language such as Java, C, C++, Visual Basic, Adobe Flash or the like. While the portable incentive application may be implemented in software, it is readily apparent to one of ordinary skill in the art that this same software code may be implemented in other well-known technologies such as firmware, hardware circuits, or a combination of each. The incentive screen 50 is generated as a standard graphical user interface to be shown on the first site 40. It is understood that the portions of the incentive screen 50, in this embodiment, provide the incentives for viewing the first site 40. In this embodiment, the incentive screen 50 contains a name 55 of the viewer, a group of incentive components 70 to be selected by a viewer and a specific incentive component window 75 selected by the viewer. The incentive screens 50 may be generated using any application, and in one embodiment, is generated using a Flash application.

In use, a viewer viewing the first site 40 would communicate through the data network 35 to the second site 45 in order to retrieve the portable incentive application that is being made available at the second site 45. After retrieving (by download or otherwise) the portable incentive application from the second site 45 to the first site 40, the viewer is able to incorporate the incentives being offered on the incentive screen 50 into the first site 40. In this manner, the first site 40 is able to simply and easily incorporate the portable incentive application from a second site 45 directly into the first site 40 and customize that portable incentive application with the first site offerings being provided by the first site 40. A viewer using the incentive screen 50 would then be able to customize the incentive screen 50 to any of the first site offerings being purchased or viewed. In this way, a first site 40 can easily use the portable incentive application from the second site without having to develop its own incentive application at a higher cost. For example, in one embodiment, a viewer may receive points for each time the viewer visits the first site 40. In another embodiment, the viewer may receive any one of a number of incentive components that include, for example, points, leaderboard recognition, level status, achievement status, additional avatars, a virtual room, a friend-list and other similar incentives for attracting the visitor to the first site 40. Again, the incentives can be used to reward the viewer for visiting the site, purchasing goods on the site, purchasing services on the site, or merely viewing information on the site. Still further incentive components may be added to the first site 40 including a messaging module, a blogging module and other similar types of modules that reward the viewer for viewing the first site 40. These components provide additional functionality to the viewer to keep the viewer engaged with the host site.

Figure 2:
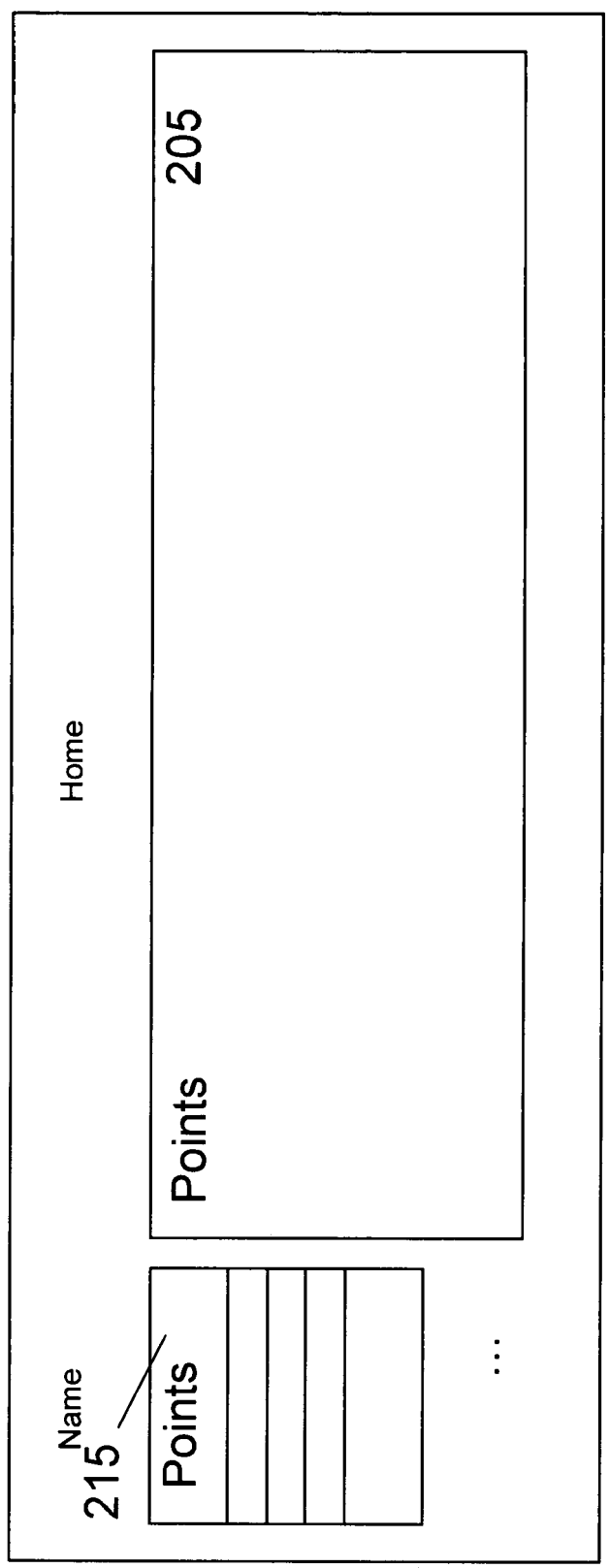
FIG. 2 is a block diagram view of an embodiment of a computer screen displaying a site with an embodiment of the portable incentive application of the present invention.

FIG. 2 is a block diagram view of an embodiment of a computer screen displaying a site with an embodiment of the portable incentive application of the present invention. In FIG. 2, an embodiment of the incentive screen 50 depicts the incentive screen 50 of FIG. 1 with the incentive component screen 205 showing a points component being selected as part of the incentive component group 70 of FIG. 1. In this embodiment, a viewer has selected the incentive component 215 listing points in the incentive components group 70 of FIG. 1. Through this selection, the incentive component screen 205 depicts a detailed listing of the number of points earned by the viewer for performing certain actions on the first site 40. For example, the viewer may be awarded a million points for visiting the first site 40 and 500,000 points for each purchase of an item or service on the first site 40, where these actions would be listed in the incentive component screen 205. As part of the incentive component screen 205, a viewer may also be notified of the remaining number of points needed to achieve a further reward or point level. In addition to the number of points earned by the viewer, this component may also display the total number of points a viewer currently owns, also known as their point balance, as the viewer may have redeemed points for various items.

Figure 3:
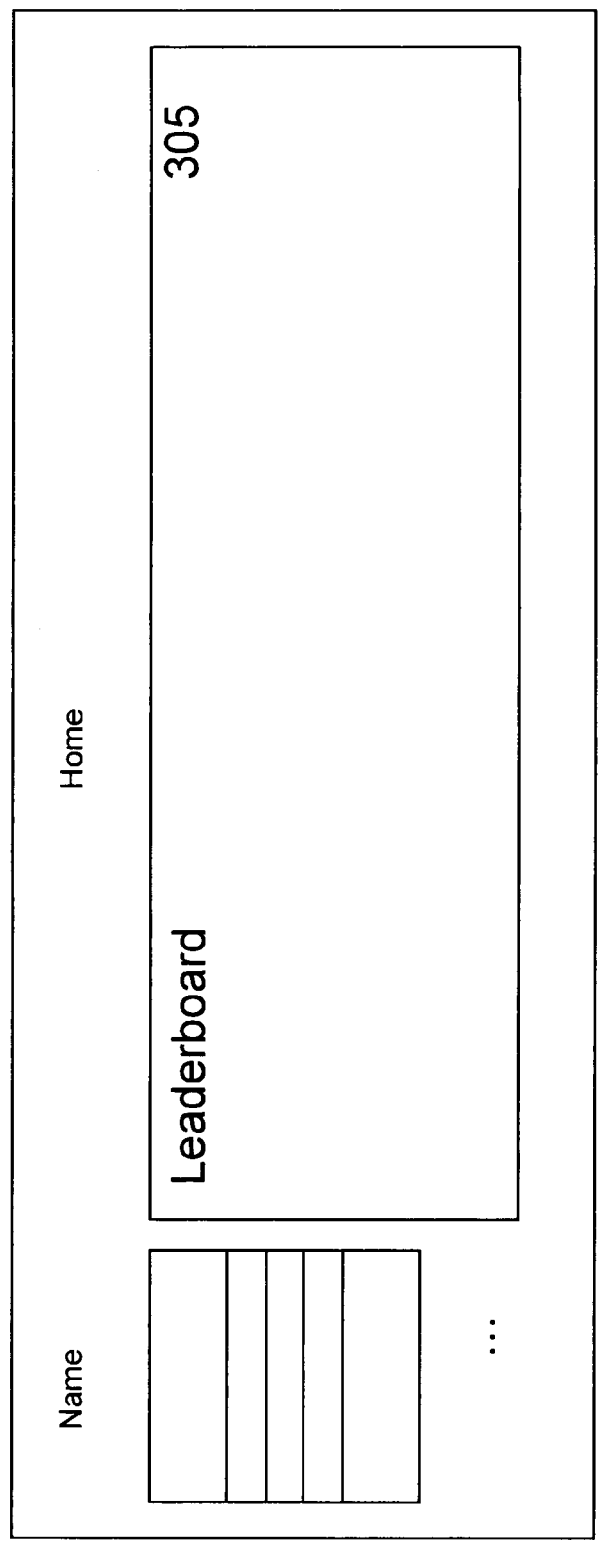
FIG. 3 is a block diagram view of an embodiment of a computer screen displaying a site with an embodiment of the portable incentive application of the present invention.

FIG. 3 is a block diagram view of an embodiment of a computer screen displaying a site with an embodiment of the portable incentive application of the present invention. In FIG. 3, the incentive component screen 305 displays a leaderboard component being selected as part of the incentive component group 70 of FIG. 1. In this embodiment, the viewer has selected the leaderboard component that ranks the viewer among other users or viewers of the first site 40 based on any comparison value. For example, the leader component 305 may list relative points among different visitors to the first site 40. In this way, the first site 40 can customize the leaderboards in order to reflect the first site 40 objectives of gathering information, sales or service offerings. The leaderboard component 305 is also able to, in one embodiment, highlight specific users that have achieved a certain status of the leaderboard. The leaderboard component 305, in another embodiment, is also able to provide subcategories of the leader board. For example, in one embodiment, the leaderboard component 305 may display the number of points received by various viewers, while a subcategory may display the number of viewers that have purchased the most services or goods from the first site 40.

Figure 4:
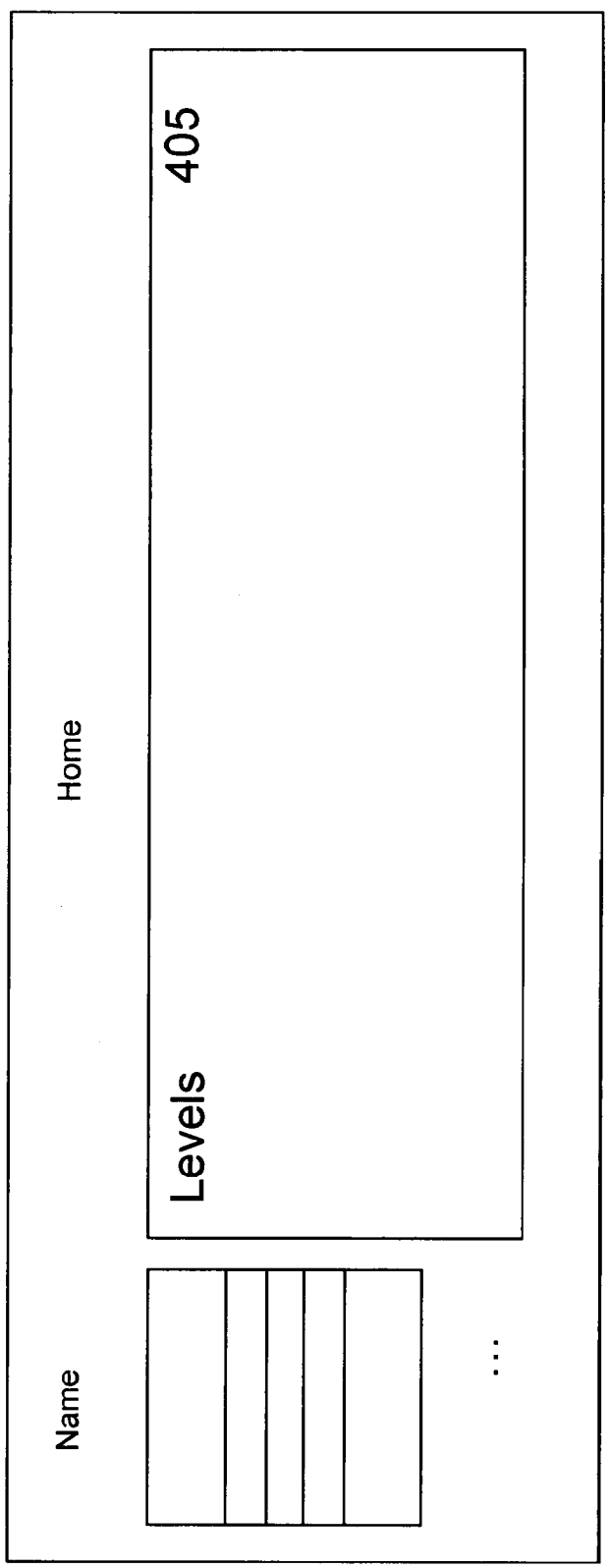
FIG. 4 is a block diagram view of an embodiment of a computer screen displaying a site with an embodiment of the portable incentive application of the present invention.

FIG. 4 is a block diagram view of an embodiment of a computer screen displaying a site with an embodiment of the portable incentive application of the present invention. In FIG. 4, a level component 405 has been selected from the incentive component group 70 of FIG. 1. In this embodiment, the level component 405 is used to display accumulated points in one embodiment where the accumulated points provides incentives to the viewer to reach different levels of the level component 405. In one embodiment, the level component permits a viewer to unlock new goods or services provided by the first site 40. For example, in one embodiment, achieving a level of "one" would permit the viewer to achieve significant discounts from the first site 40. In that same embodiment, a level of "two" would then provide the viewer with free goods or services.

Figure 5:
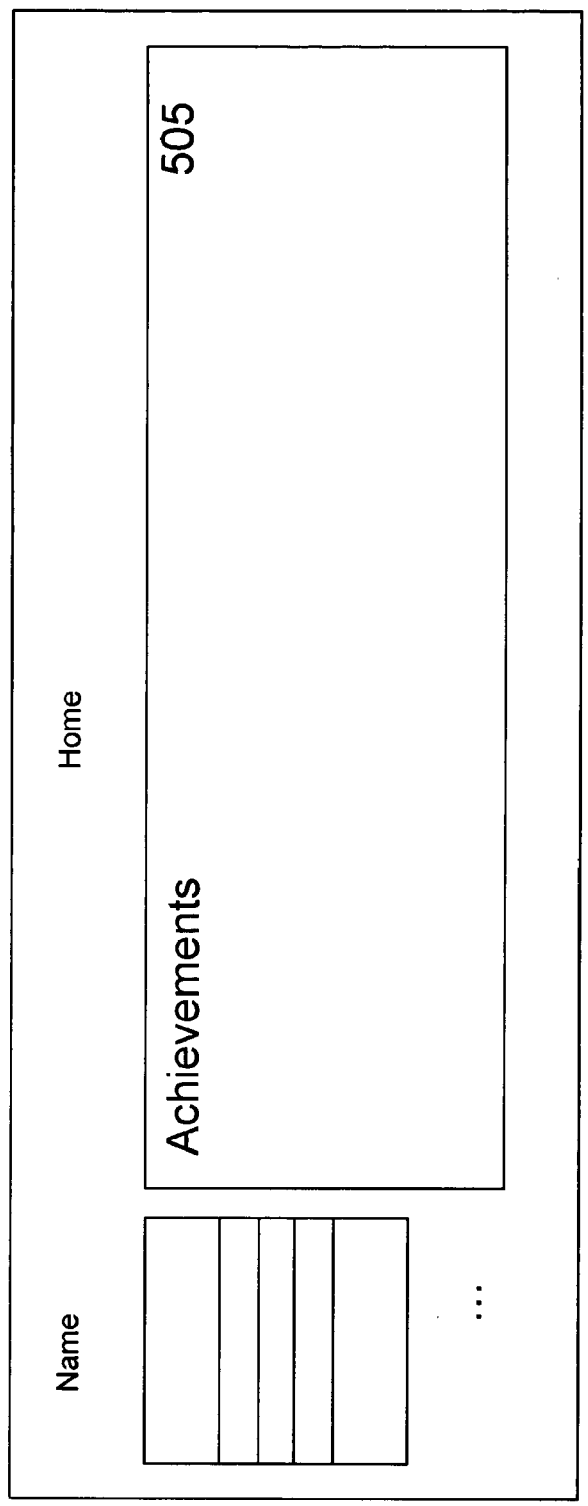
FIG. 5 is a block diagram view of an embodiment of a computer screen displaying a site with an embodiment of the portable incentive application of the present invention.

FIG. 5 is a block diagram view of an embodiment of a computer screen displaying a site with an embodiment of the portable incentive application of the present invention. In FIG. 5, an achievements component 505 has been selected from the incentive component group 70 of FIG. 1. The achievement component 505, in one embodiment, delivers digital rewards to viewers such as badges or other virtual items for the viewer to earn based on goals set by the first site 40. The achievements component 505 permits the first site 40 to have viewers collect virtual items on the site as types of "trophies" or other types of achievements. The first site 40 may continuously add different achievements, badges or other virtual items for viewers to achieve. In addition, some of these achievement components 50 can be provided on a limited basis to provide even more incentives to viewers since the achievements are rarely available. Badges, in one embodiment, may be simple static graphics or, in alternative embodiments, may be animated data such as movie or audio clips. Each badge may contain additional information concerning that badge including how the badge was earned or how the badge may be earned by performing a certain action (e.g. interacting with the badge or even selecting the badge).

Figure 6:
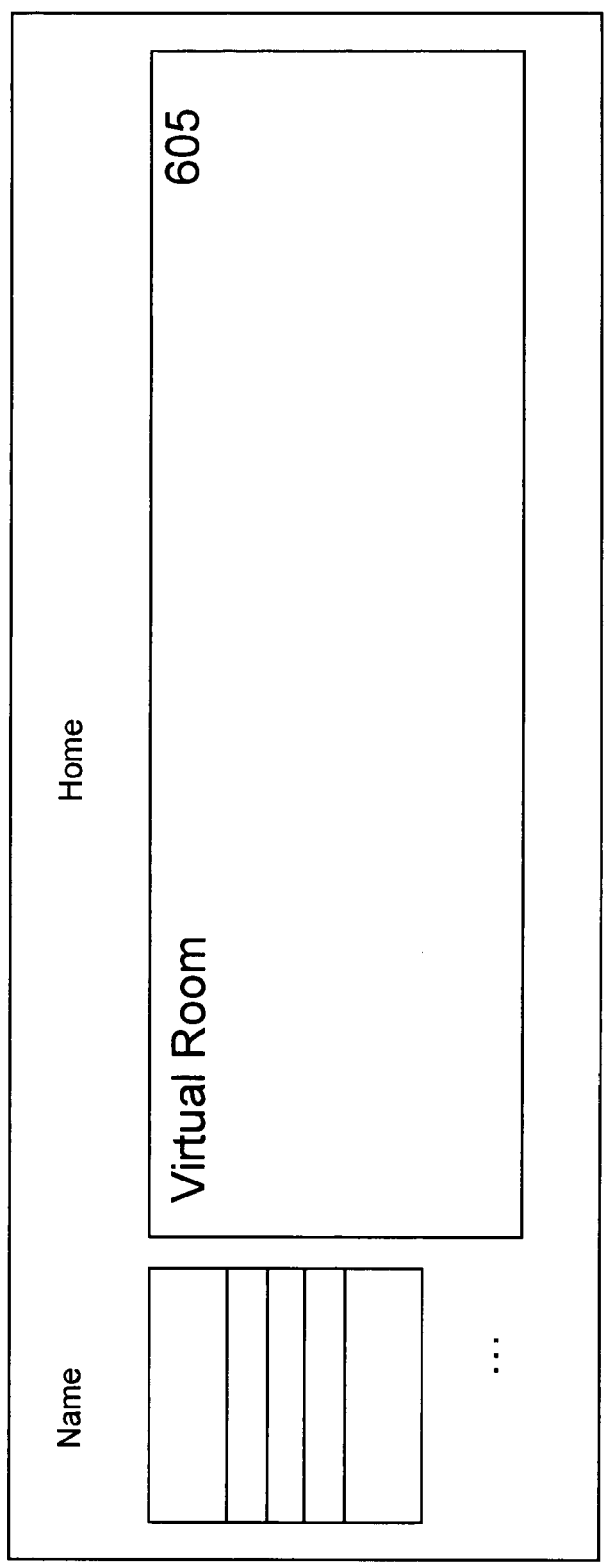
FIG. 6 is a block diagram view of an embodiment of a computer screen displaying a site with an embodiment of the portable incentive application of the present invention.

FIG. 6 is a block diagram view of an embodiment of a computer screen displaying a site with an embodiment of the portable incentive application of the present invention. In FIG. 6, a virtual room component 605 is selected from the incentive component group 70 of FIG. 1. When selected, the virtual room component 605 gives a viewer a blank area on the first site 40 where the viewer can customize that area in any manner by placing data onto that area. The items placed in the area can either be purely decorative such as images or may even be functional such as a music player or an answering service. The items placed in the virtual room components can be manipulated in any manner including manipulation by rotation, scaling or otherwise.

Figure 7:
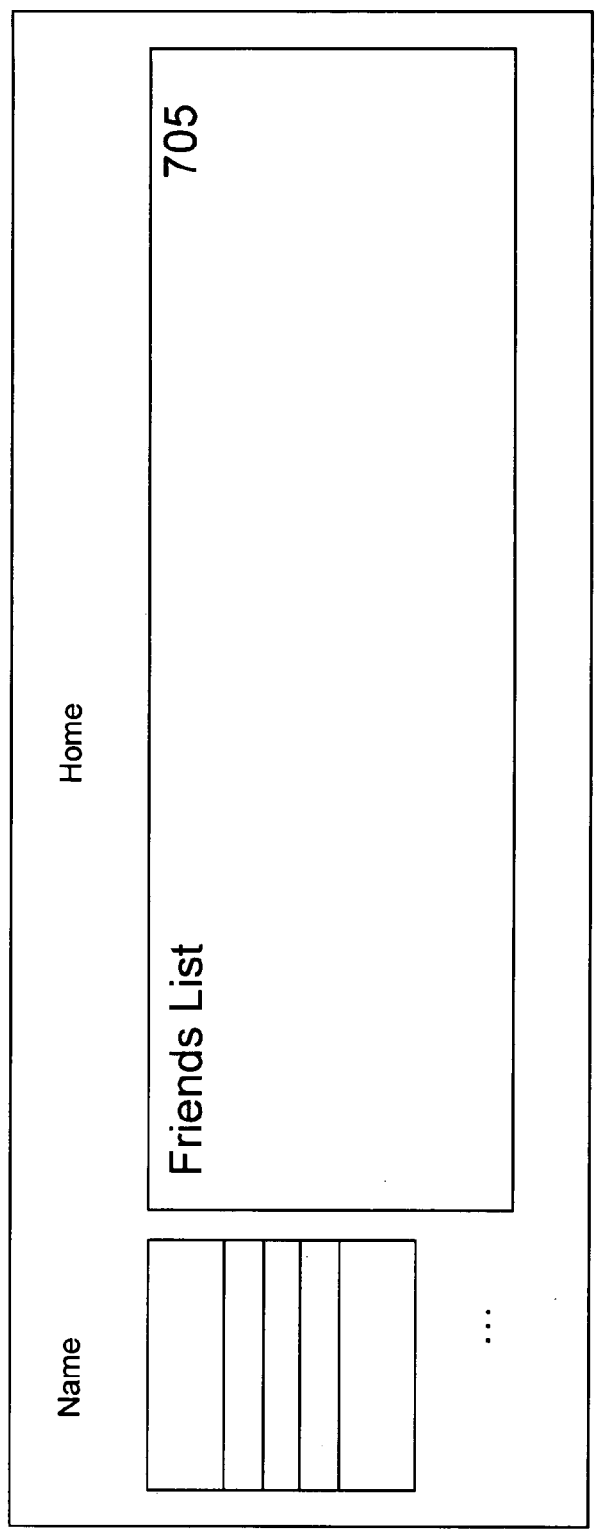
FIG. 7 is a block diagram view of an embodiment of a computer screen displaying a site with an embodiment of the portable incentive application of the present invention.

FIG. 7 is a block diagram view of an embodiment of a computer screen displaying a site with an embodiment of the portable incentive application of the present invention. In FIG. 7, a friends list component 705 is displayed in the incentive component screen and selected from the incentive component group 70 of FIG. 1. When selected, the friends list component 705 displays a listing of designated individuals selected by the viewer to add to the friends list component. By selecting these friends on the list, the viewer can take an action with respect to that friend, such as initiating a chat with the friend or buying them a gift, or the viewer can be redirected to the web page of the friend to view personal information about the friend, such as an avatar, profile, achievements or other identifying information that identifies the friend. Once on the friend's page, a text message may be transmitted, data images or files may be sent or even items from the friend's page can be purchased. Any type of data interaction is with the friend's page may be performed, in one embodiment.

Figure 8:
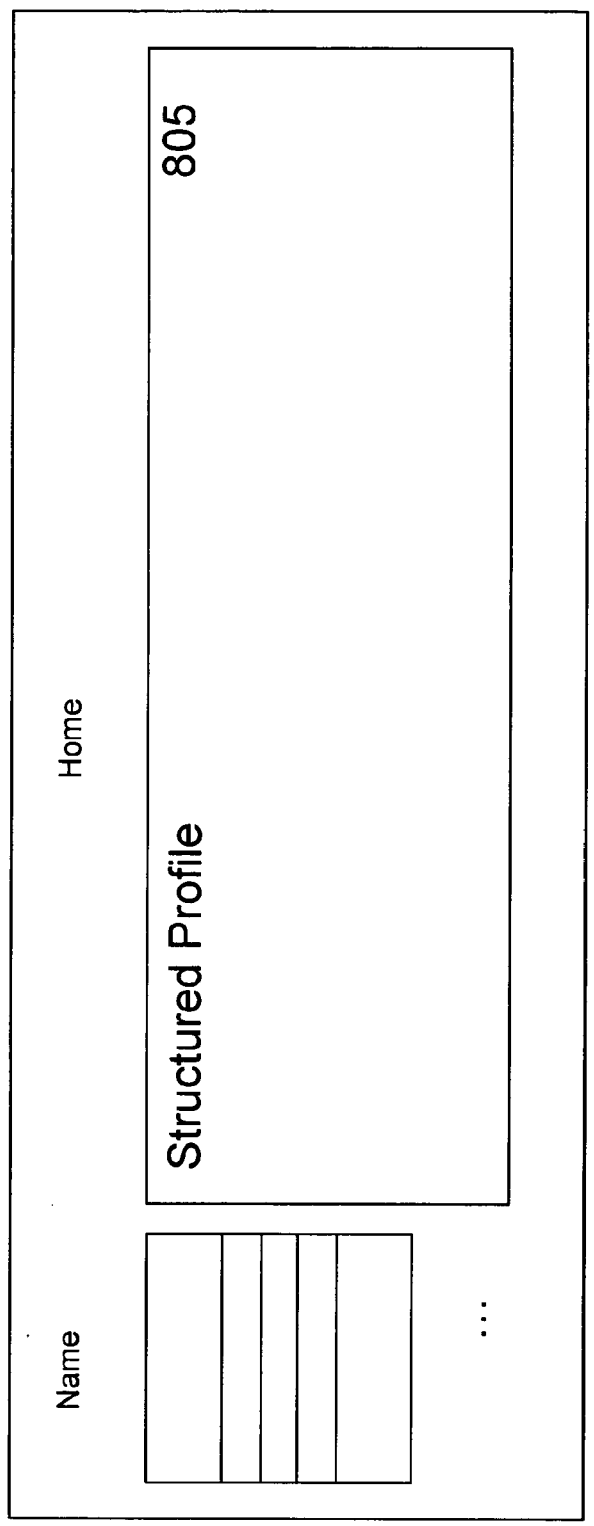
FIG. 8 is a block diagram view of an embodiment of a computer screen displaying a site with an embodiment of the portable incentive application of the present invention.

FIG. 8 is a block diagram view of an embodiment of a computer screen displaying a site with an embodiment of the portable incentive application of the present invention. In FIG. 8, a structured profile component is displayed in incentive component screen 805. The structured profile component was selected from the incentive component group 70 of FIG. 1. The structured profile component contains various text entry and dropdown fields where a viewer can enter profile information identifying the viewer. The structured profile also contains other data describing the viewer including data such as points accumulated by the viewer in their point account and any of the other data accumulated from the other incentive components.

Figure 9:
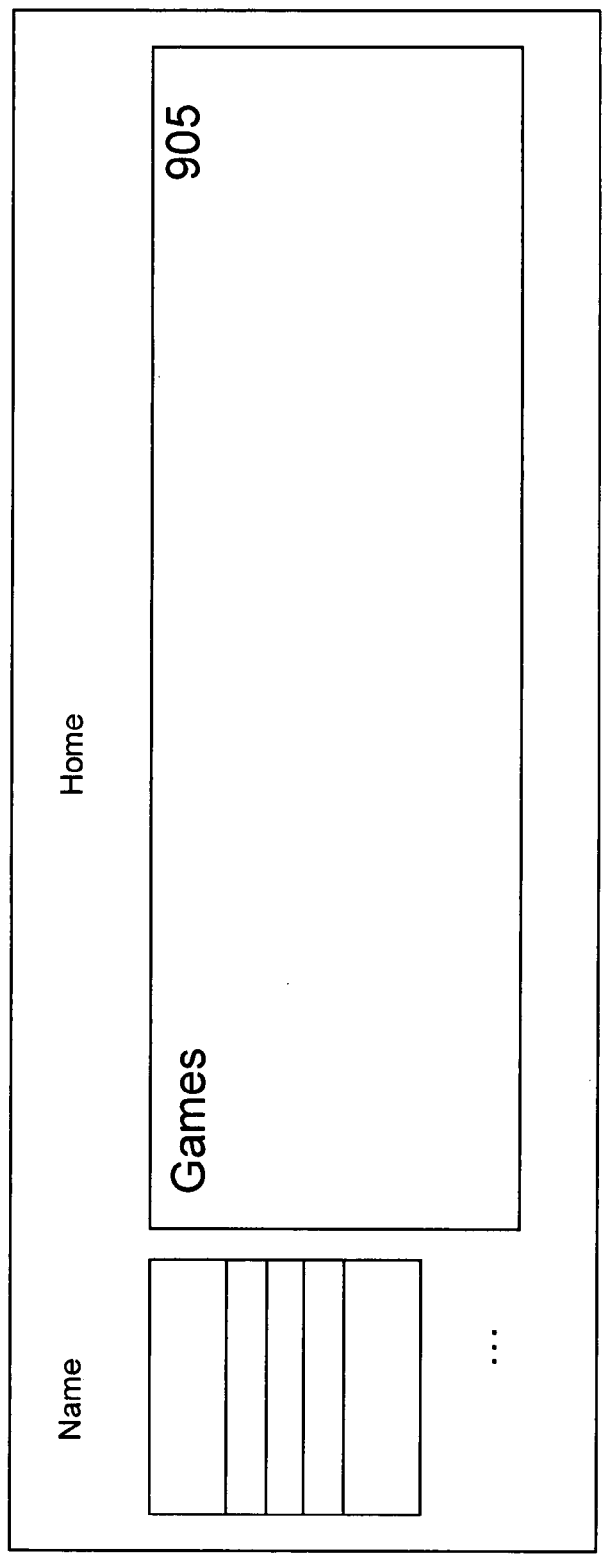
FIG. 9 is a block diagram view of an embodiment of a computer screen displaying a site with an embodiment of the portable incentive application of the present invention.

FIG. 9 is a block diagram view of an embodiment of a computer screen displaying a site with an embodiment of the portable incentive application of the present invention. In FIG. 9, a games component is displayed in the incentive component screen 905. The games component was selected from the incentive component group 70 of FIG. 1. The games component is used to initiate games and tournaments, and to display a viewer's data in any games that have been played or participated in by the viewer on the first site 40. This embodiment includes, for example, a game directory, personal high scores, wins/losses versus other players, the creation and current status of game tournaments, and the performance of viewer submitted creations into games. It is understood that, throughout this application, individuals are referred to as "viewers" or "owners" in reference to a portable incentive application. A viewer can view his/her own portable incentive application (which in this instance the viewer is both a viewer and an owner) or can view the portable incentive application of others and is therefore a "viewer" of a portable incentive application. An owner of a portable incentive application is, in one embodiment, the creator of the portable incentive application and typically can makes changes to the portable incentive application. To make changes to a portable incentive application, an owner typically needs "privileges" to make changes. These "privileges" are also used to distinguish an owner from a viewer, the former having privileges while the latter generally not. With privileges or as the owner, the owner is able to not only make changes to the portable incentive application, but is also able to view different parts of the portable incentive application that are not available to everyone. That is, if an owner has privileges (or a friend has privileges), then that entity with privileges is able to see extended portions of a portable incentive application that an entity without privileges cannot. The privileges may be set by the site in a variety of ways, including through passwords or other manners of identifying an entity on a portable incentive application.

Figure 10:
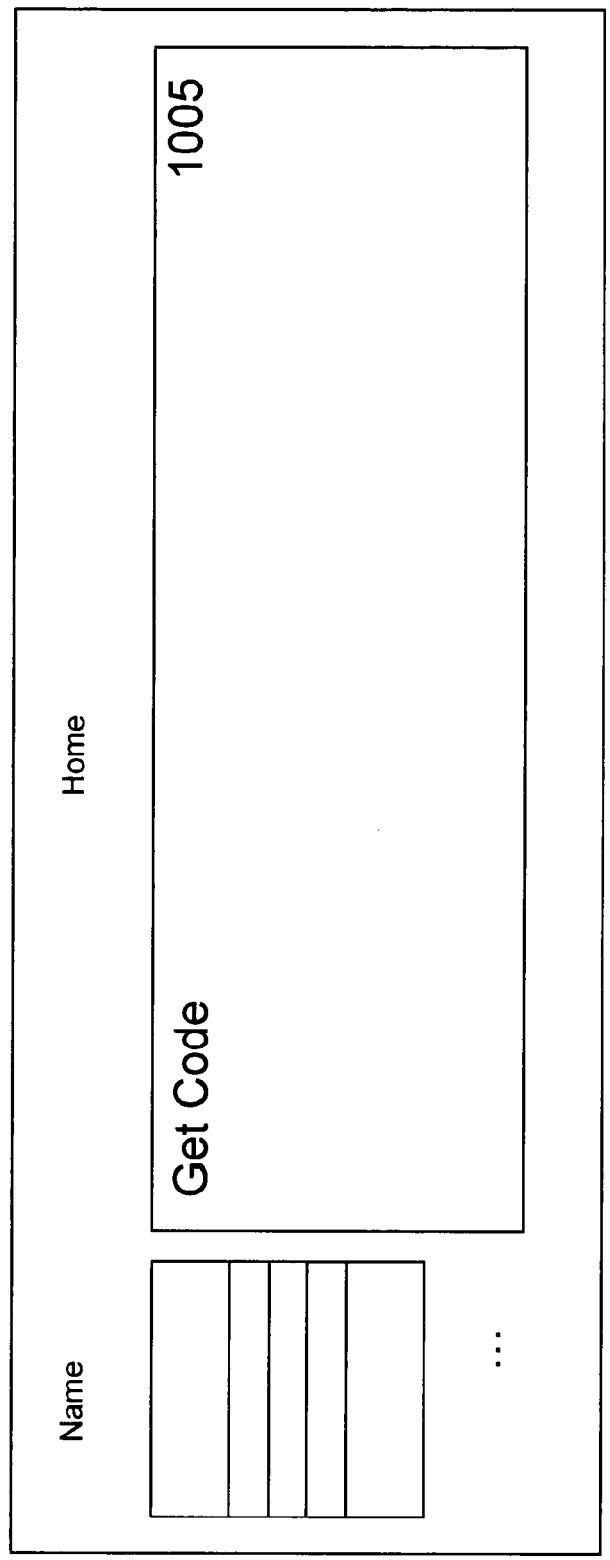
FIG. 10 is a block diagram view of an embodiment of a computer screen displaying a site with an embodiment of the portable incentive application of the present invention.

FIG. 10 is a block diagram view of an embodiment of a computer screen displaying a site with an embodiment of the portable incentive application of the present invention. In FIG. 10, a get code component is displayed in the incentive component screen 1005. The get code component was selected from the incentive component group 70 of FIG. 1. The get code component permits a viewer to obtain the software code needed to access the portable incentive application and embed it in any website that supports that application. In one embodiment, the get code component permits a viewer to embed the portable incentive application on any website that supports OBJECT\EMBED tags, as are known in the art. In another embodiment, a viewer will be able to embed only portions of the portable incentive application such as any particular component.

Figure 11:
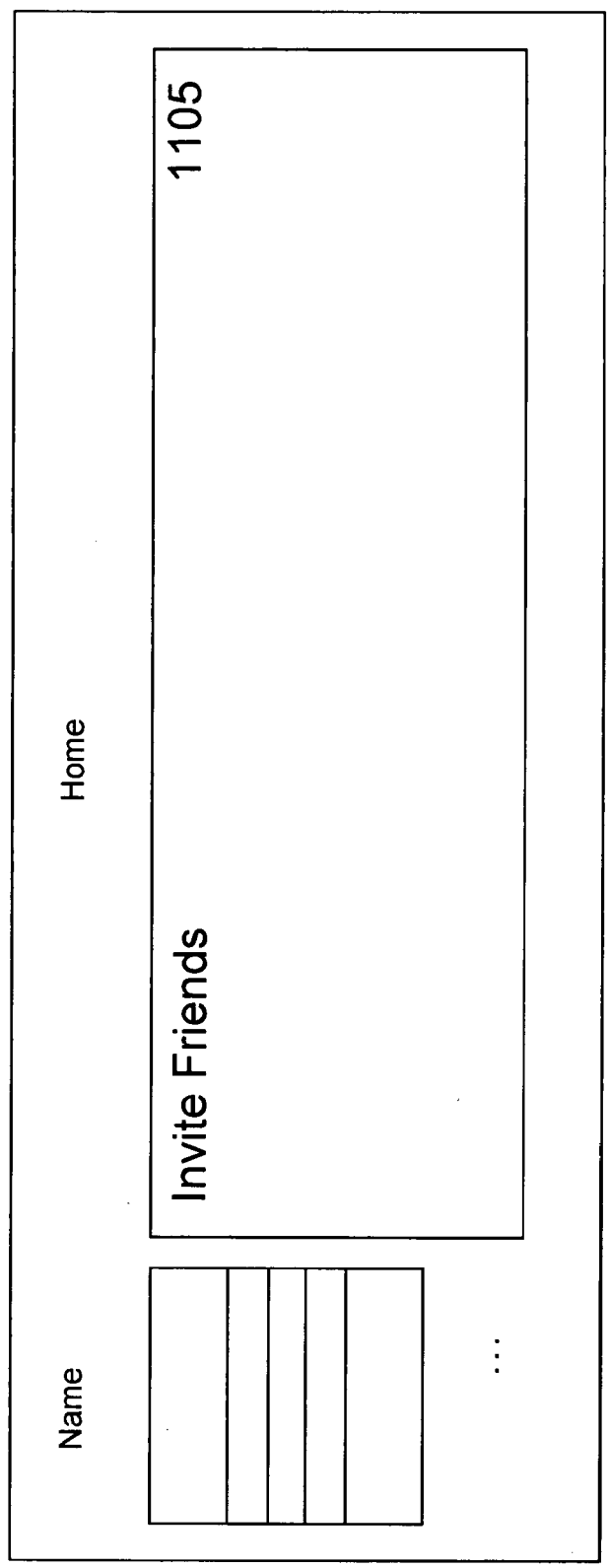
FIG. 11 is a block diagram view of an embodiment of a computer screen displaying a site with an embodiment of the portable incentive application of the present invention.

FIG. 11 is a block diagram view of an embodiment of a computer screen displaying a site with an embodiment of the portable incentive application of the present invention. In FIG. 11, an invite friends component is displayed in the incentive component screen 1105. The invite friends component has been selected from the incentive component group 70 of FIG. 1. The invite friends component allows a viewer to enter identifying information of friends (for example, the name of friend or the electronic mail address of a friend) to permit friends to obtain a copy of the portable incentive application of the present invention.

Figure 12:
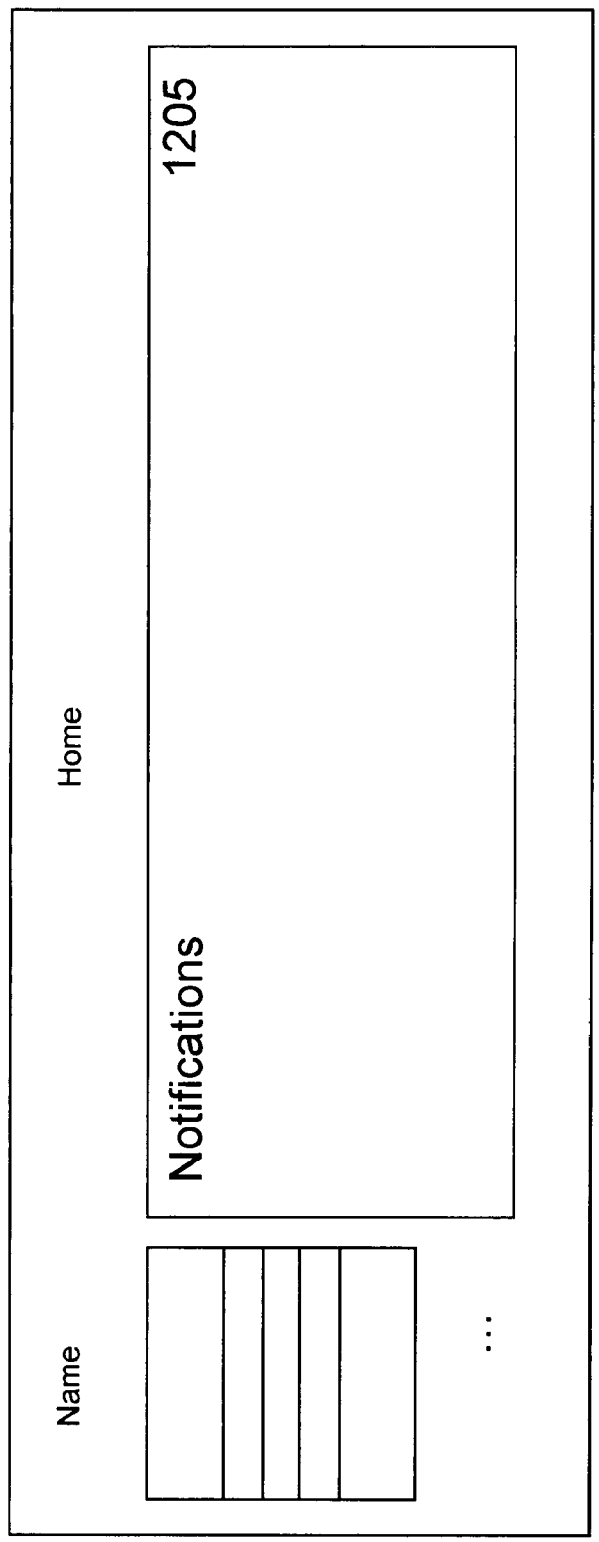
FIG. 12 is a block diagram view of an embodiment of a computer screen displaying a site with an embodiment of the portable incentive application of the present invention.

FIG. 12 is a block diagram view of an embodiment of a computer screen displaying a site with an embodiment of the portable incentive application of the present invention. In FIG. 12, a notification component is displayed in the incentive component screen 1205. The notification component is selected from the incentive component group 70 of FIG. 1. The notification component is used to notify the viewer of important events, in one embodiment. These events may be system generated, for example if the viewer completes an Achievement, the notification component would notify the viewer. Notifications may also be sent by the first site 40 to all the viewers of the first site 40. Notifications can be of a broadcast nature, sent to all the viewers of the first site 40, or of an individual nature, sent only to a particular viewer.

Figure 13:
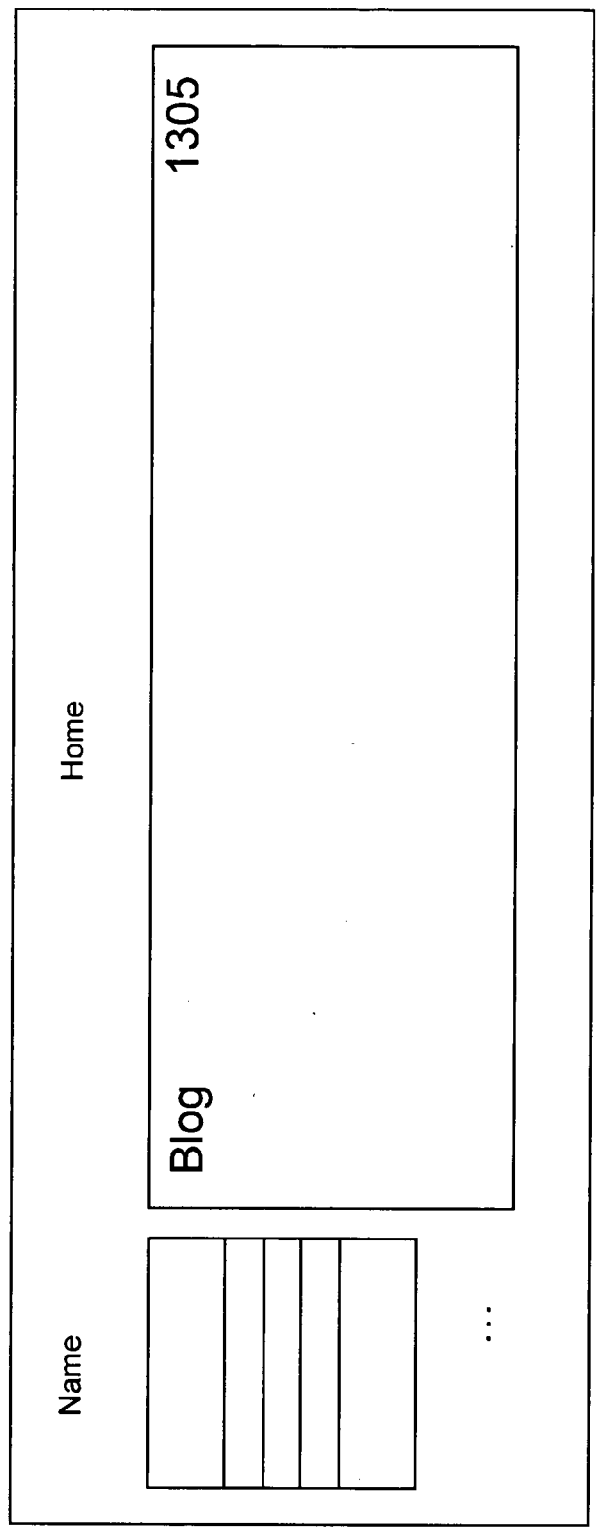
FIG. 13 is a block diagram view of an embodiment of a computer screen displaying a site with an embodiment of the portable incentive application of the present invention.

FIG. 13 is a block diagram view of an embodiment of a computer screen displaying a site with an embodiment out of the portable incentive application of the present invention. In FIG. 13, a blog component is displayed in the incentive component screen 1305. The blog component is selected from the incentive component group 70 of FIG. 1. The blog component permits a viewer to add, remove or otherwise edit simple text blog entries and permit other viewers to read those blog entries. Entries may also include other media assets, for example, audio, image and video file. It is understood that any type of data, whether audio, image, video or text may be placed on the blog component. In one embodiment, the blog entries are all publicly available to all viewers on the website.

Figure 14:
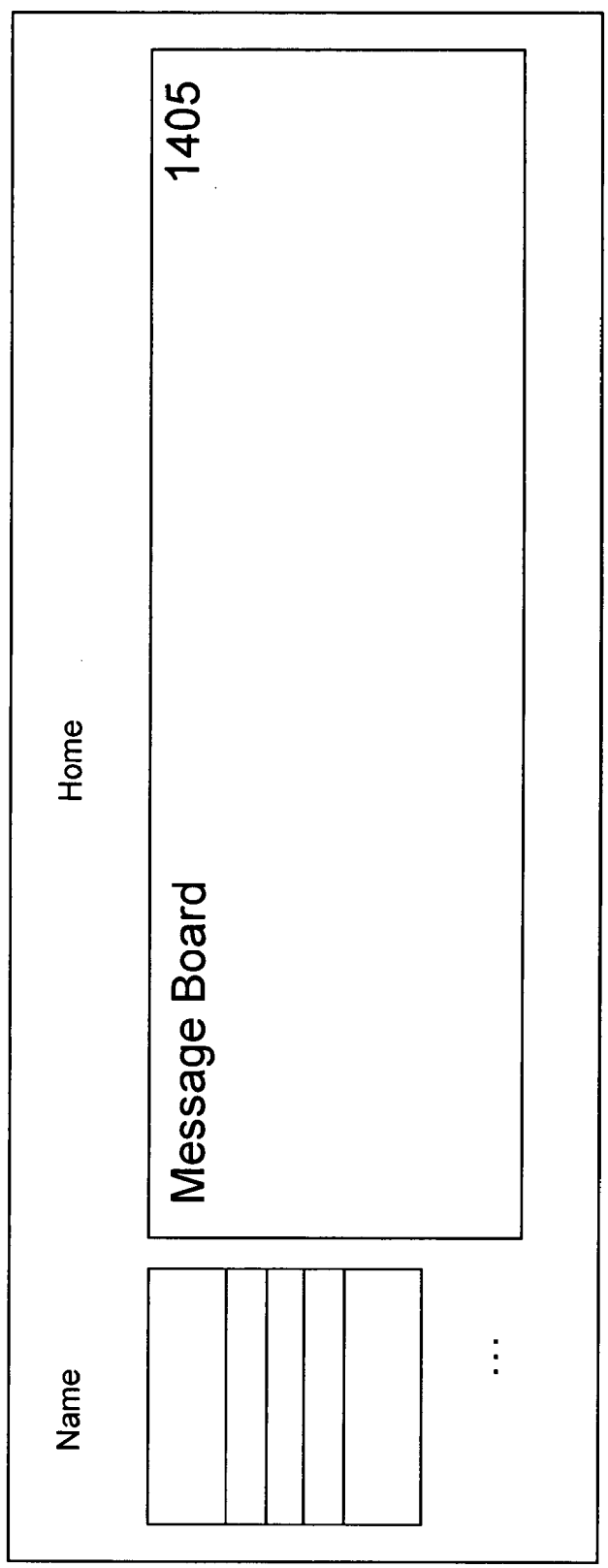
FIG. 14 is a block diagram view of an embodiment of a computer screen displaying a site with an embodiment of the portable incentive application of the present invention.

FIG. 14 is a block diagram view of an embodiment of a computer screen displaying a site with an embodiment of the portable incentive application of the present invention. In FIG. 14, a message board component is displayed in the incentive component screen 1405. The message board component is selected from the incentive component group 70 of FIG. 1. The message board component permits visitors of the first site to communicate with the named individual on the incentive component screen with text messages. In one embodiment, those text messages may be public, or alternatively in another embodiment, a private message. In a still further embodiment, the message board component permits voice or video messages. It is understood that any type of data, whether voice, video or text may be placed on the message board component.

Figure 15:
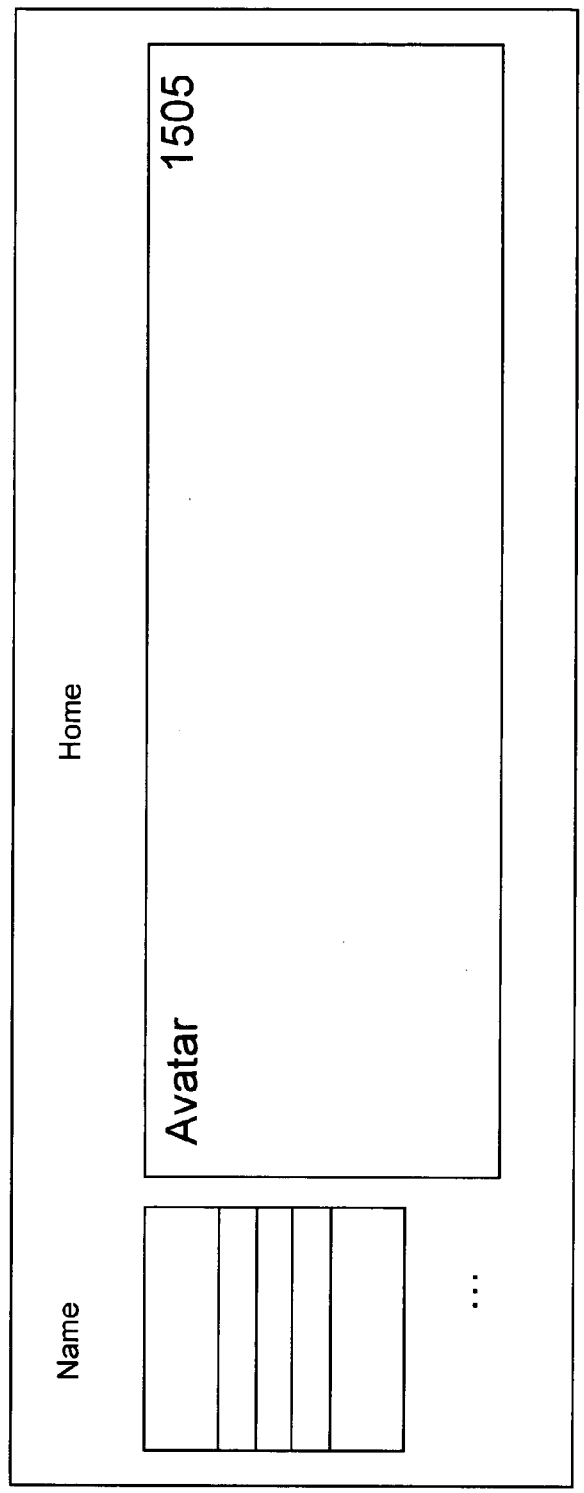
FIG. 15 is a block diagram view of an embodiment of a computer screen displaying a site with an embodiment of the portable incentive application of the present invention.

FIG. 15 is a block diagram view of an embodiment of a computer screen displaying a site with an embodiment of the portable incentive application of the present invention. In FIG. 15, an avatar component is displayed in the incentive component screen 1505. The avatar component is selected from the incentive component group 70 of FIG. 1. In this embodiment, the avatar is a digital representation of the viewer. This digital representation is shown here in the avatar component, and can also be shown elsewhere on the first site 40 through an API embodiment of the portable incentive application. Viewers may acquire body parts, clothing and accessories for their avatar in order to customize it, using their earned points. Viewers may also buy avatar items as gifts for their friends' avatars.

Figure 16:
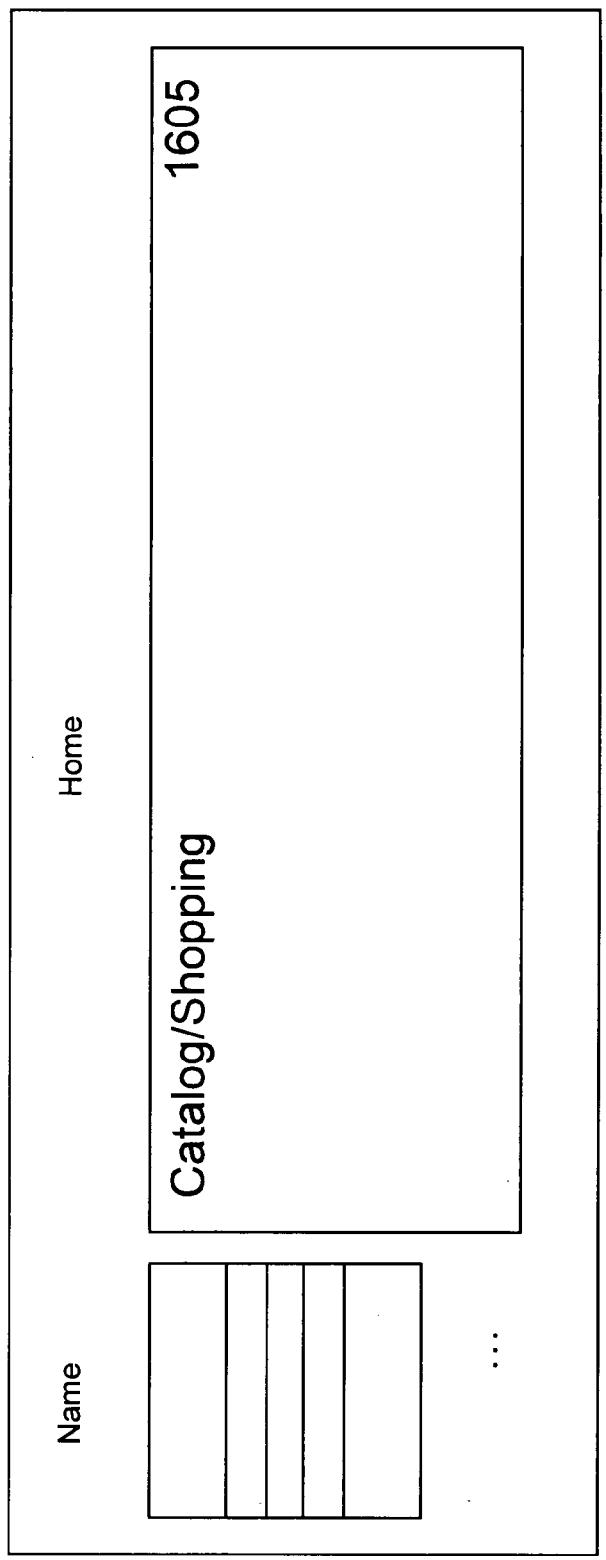
FIG. 16 is a block diagram view, of an embodiment of a computer screen displaying a site with an embodiment of the portable incentive application of the present invention.

FIG. 16 is a block diagram view of an embodiment of a computer screen displaying a site with an embodiment of the portable incentive application of the present invention. In FIG. 16, a catalog/shopping component is displayed in the incentive component screen 1605. The catalog/shopping board component is selected from the incentive component group 70 of FIG. 1. The catalog/shopping component permits viewers to browse, search and purchase items, both digital and physical, using their earned points.

Figure 17:
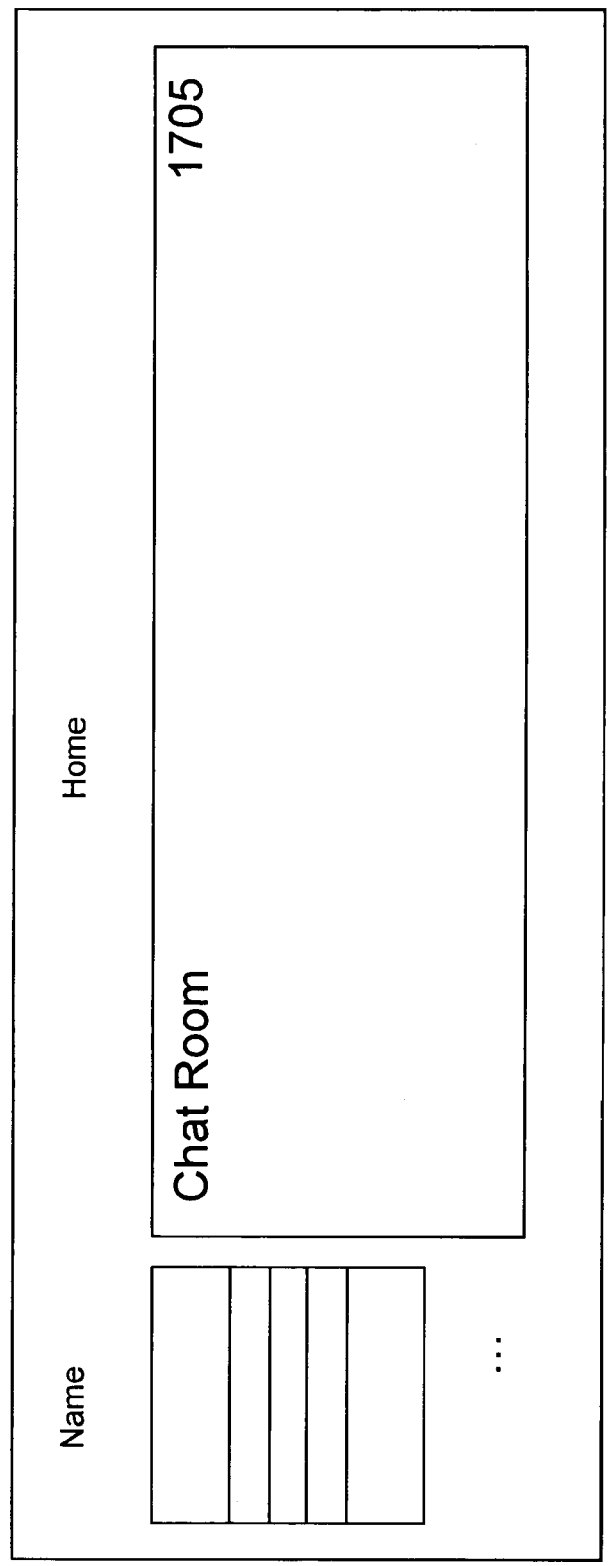
FIG. 17 is a block diagram view of an embodiment of a computer screen displaying a site with an embodiment of the portable incentive application of the present invention.

FIG. 17 is a block diagram view of an embodiment of a computer screen displaying a site with an embodiment of the portable incentive application of the present invention. In FIG. 17, a chat room component is displayed in the incentive component screen 1705. The chat room component is selected from the incentive component group 70 of FIG. 1. The chat room component permits all the viewers of a portable incentive application to chat in real-time with each other. Groups of viewers will be able to split off into private chats and games.

Figure 18:
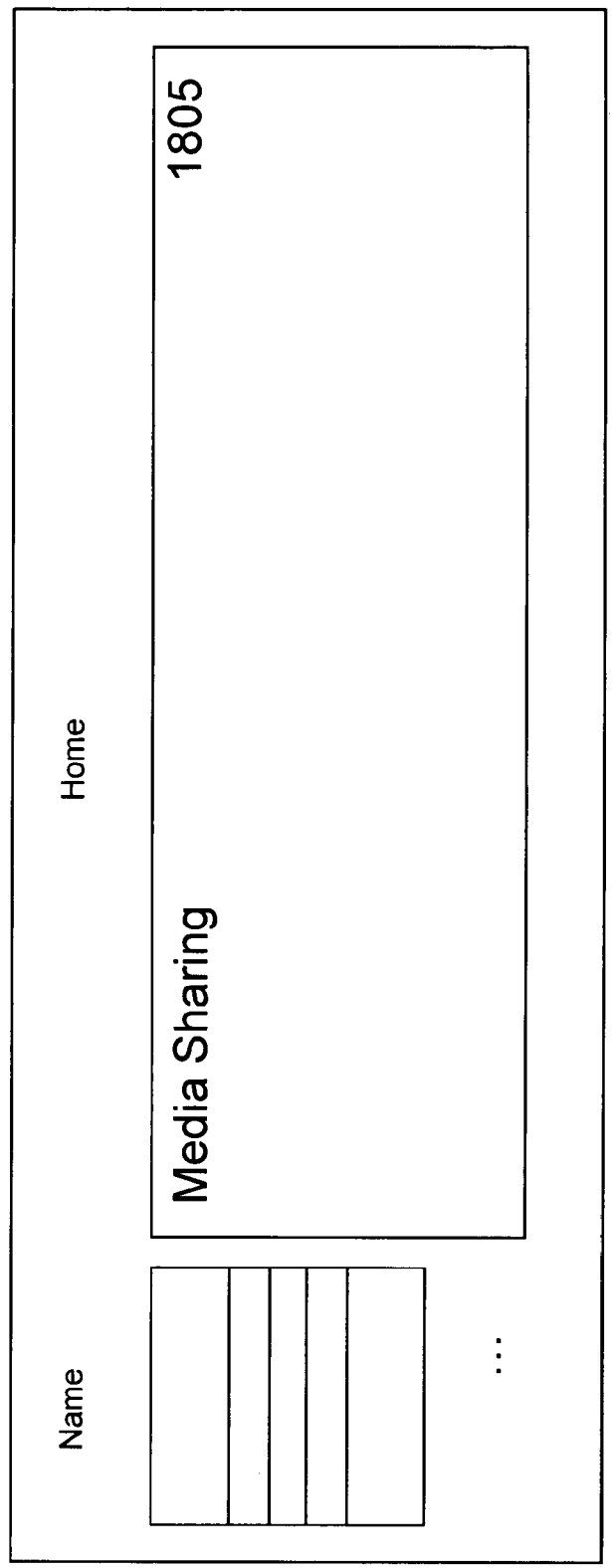
FIG. 18 is a block diagram view of an embodiment of a computer screen displaying a site with an embodiment of the portable incentive application of the present invention.

FIG. 18 is a block diagram view of an embodiment of a computer screen displaying a site with an embodiment of the portable incentive application of the present invention. In FIG. 18, a media sharing component is displayed in the incentive component screen 1805. The media sharing component is selected from the incentive component group 70 of FIG. 1. The media sharing component permits viewers to store and view various media files, including but not limited to images, music and video.

Figure 19:
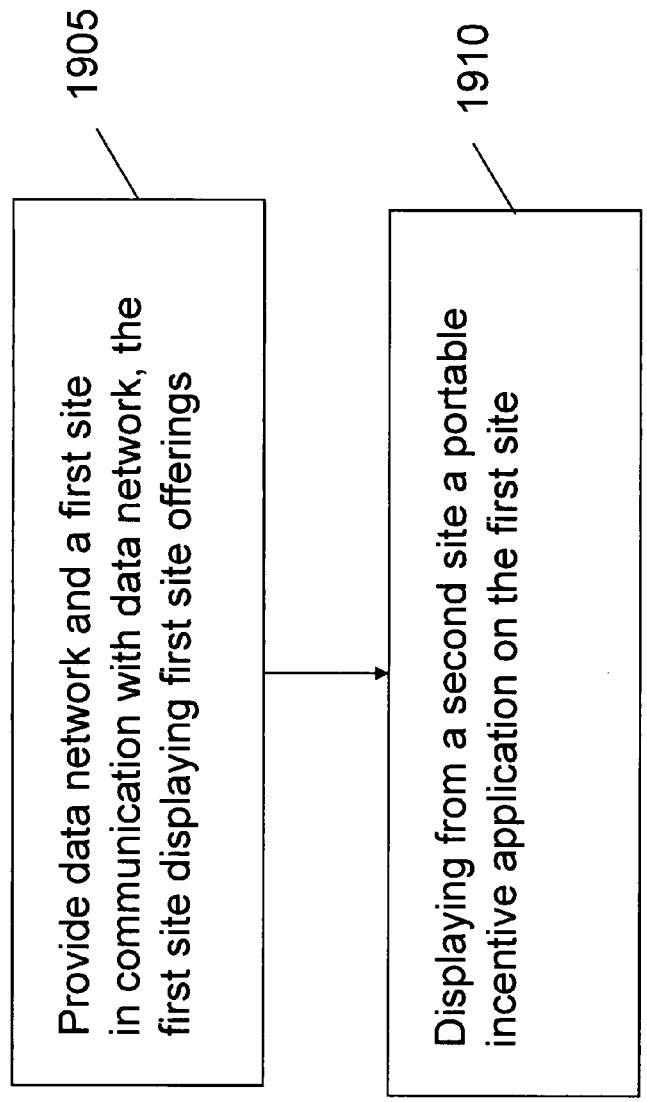
FIG. 19 is a flow chart view of an embodiment of the methodology of the present invention.

FIG. 19 is a flow chart view of an embodiment of the methodology of the present invention. In FIG. 19, an embodiment of the methodology of the present invention begins by a first site being in communication with a data network where the first site displays first site offerings at step 1905. The first site offerings, as described above, include any goods, services or information that are provided at the first site, whether payment is required for those offerings or not. At step 1910, a second site displays a portable incentive application that is available to the first site where the portable incentive application is provided on the first site to provide incentives for retrieving goods, services or information from the first site.

Figure 20:
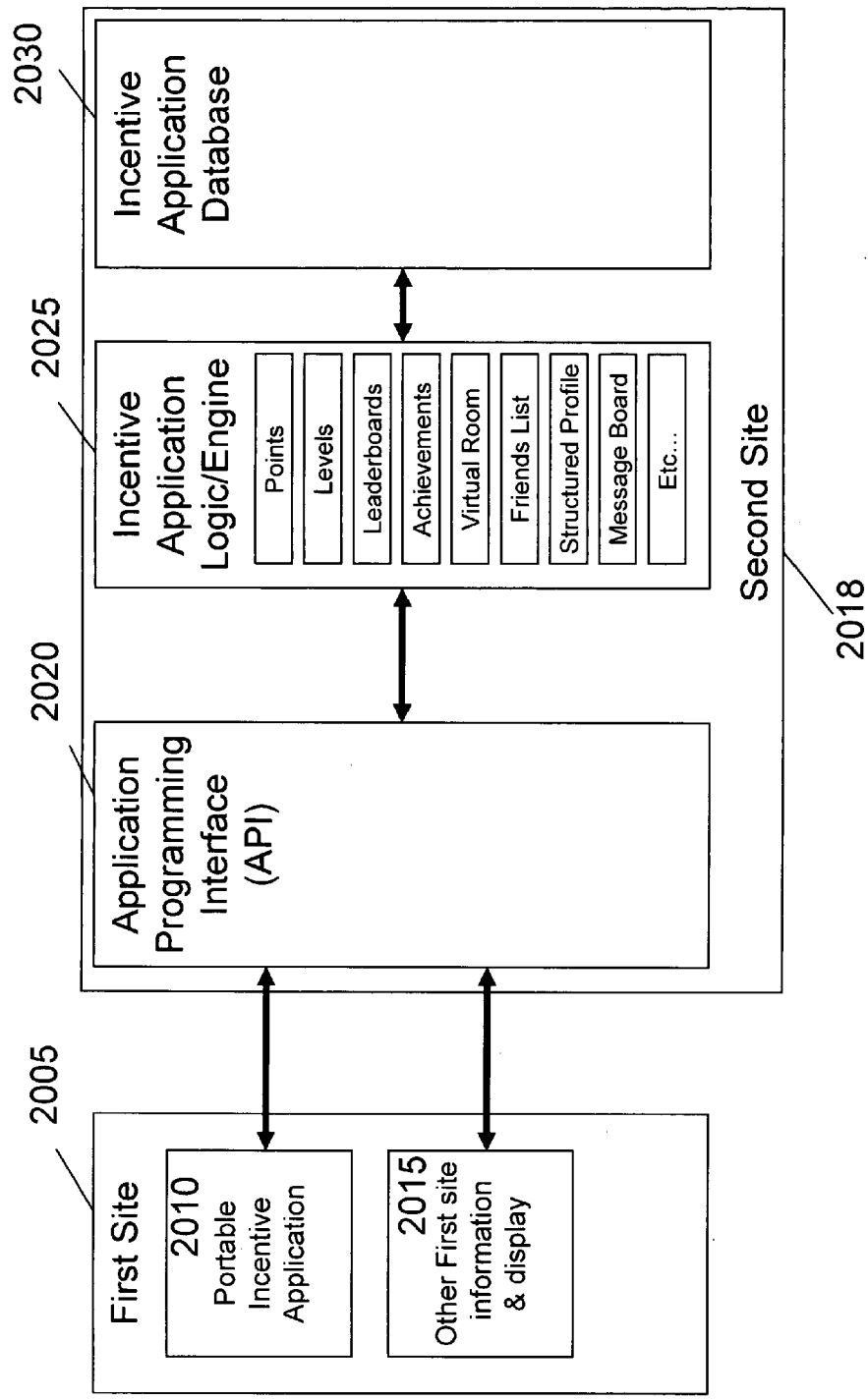
FIG. 20 is a block diagram view of an embodiment of the software components of the portable incentive application of the present invention.

FIG. 20 is a block diagram view of an embodiment of the software components of the portable incentive application of the present invention. In FIG. 20, the first site 2005 contains the portable incentive application 2010 and other first site information 2015. It is noted that while the API 2020 is shown separate and distinct from the incentive application logic/engine 2025 and the incentive application database 2030, an alternative embodiment has all these components contained within the second site 2018. However, in a distributed environment, it is also possible that the components 2020, 2025 and 2030 may be distributed throughout a data network. The API 2020 permits the incentive application logic/engine 2025 and the incentive application database 2030 to communicate with the first site 2005. The incentive application logic/engine 2025 contains the software code that controls and directs the incentive component described above. The incentive application database 2030 can be any database that contains the data entered for the particular incentive components of 2025. In one embodiment the incentive application database 2030 is an SQL database as is known in the art.

Figure 21:
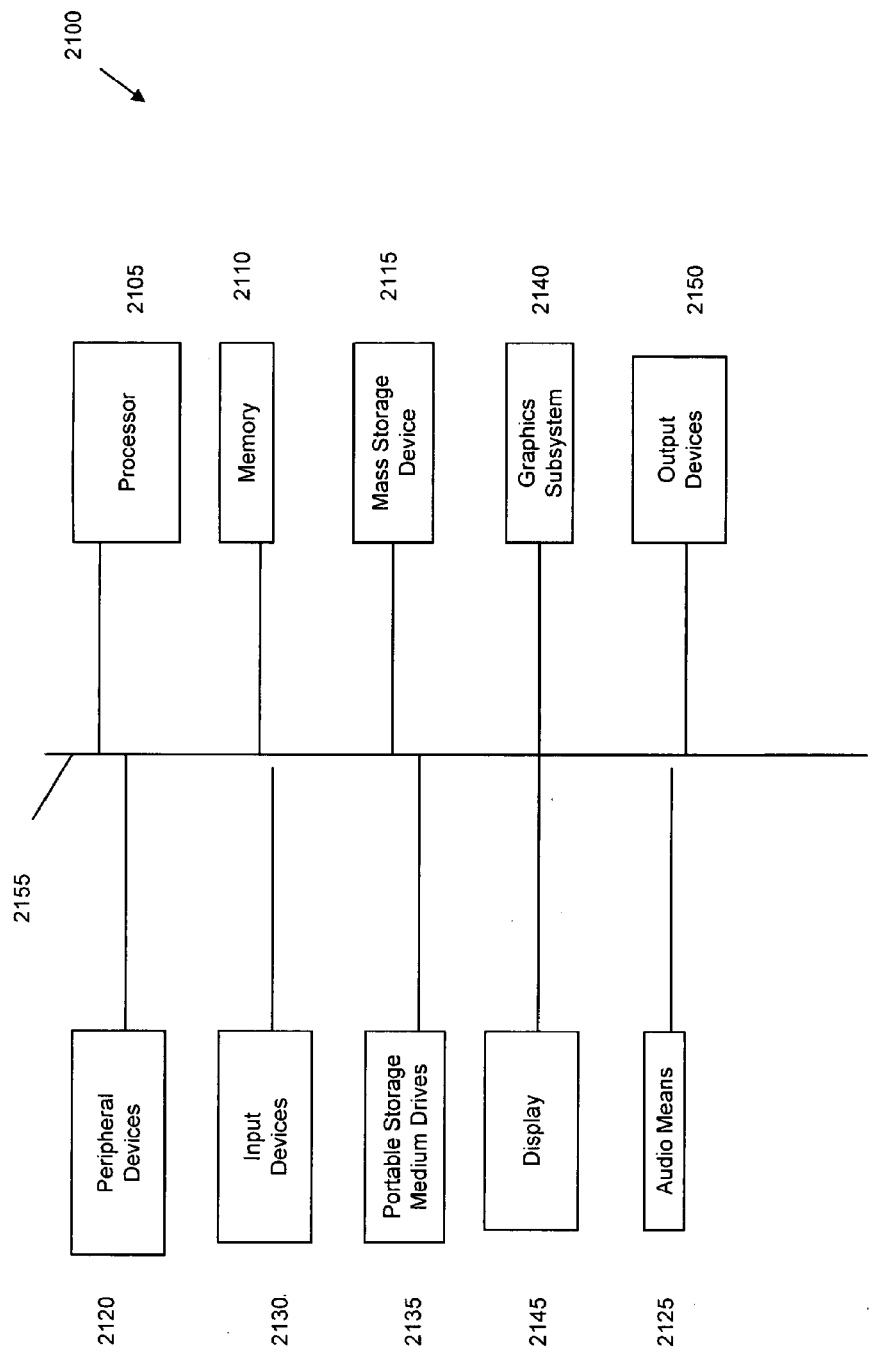
FIG. 21 is a block diagram view of an embodiment of a computer system for implementing an embodiment of the present invention.

FIG. 21 is a block diagram of a computer system 2100 used for performing an embodiment of the present invention. The computer system 2100 includes a processor 2105 for executing program instructions stored in a memory 2110. In some embodiments, processor 2105 includes a single microprocessor, while in others, processor 2105 includes a plurality of microprocessors to define a multi-processor system. The memory 2110 stores instructions and data for execution by processor 2105, including instructions and data for performing the methods described above. Depending on the extent of software implementation in computer system 2100, the memory 2110 stores executable code when in operation. The memory 2110 includes, for example, banks of read-only memory (ROM), dynamic random access memory (DRAM) as well as high-speed cache memory.

Still in FIG. 21, within computer system 2100, an operating system comprises program instruction sequences that provide services for accessing, communicating with, and controlling the computer system 2100. The operating system provides a software platform upon which application programs may execute, in a manner readily understood by those skilled in the art.

Further in FIG. 21, the computer system 2100 incorporates any combination of additional devices. These include, but are not limited to, a mass storage device 2115, one or more peripheral devices 2120, an audio means 2150, one or more input devices 2130, one or more portable storage medium drives 2135, a graphics subsystem 2140, a display 2145, and one or more output devices 2150. The various components are connected via an appropriate bus 2155 as known by those skilled in the art. In alternative embodiments, the components are connected through other communications media known in the art. In one example, processor 2105 and memory 2110 are connected via a local microprocessor bus; while mass storage device 2115, peripheral devices 2120, portable storage medium drives 2135, and graphics subsystem 2140 are connected via one or more input/output buses.

Continuing in FIG. 21, mass storage device 2115 is implemented as fixed and/or removable medium, for example, as a magnetic, optical, or magneto-optical disk drive. The drive is preferably a non-volatile storage device for storing data and instructions for use by processor 2105. In some embodiments, mass storage device 2115 stores client and server information, code for carrying out methods in accordance with exemplary embodiments of the invention, and computer instructions for processor 2105. In other embodiments, computer instructions for performing methods in accordance with exemplary embodiments of the invention also are stored in processor 2105. The computer instructions are programmed in a suitable language such as Java, C or C++.

In FIG. 21, the portable storage medium drive 2135, in some embodiments, operates in conjunction with a portable non-volatile storage medium, such as a floppy disk, CD-ROM, or other computer-readable medium, to input and output data and code to and from the computer system 2100. In some embodiments, methods performed in accordance with exemplary embodiments of the invention are implemented using computer instructions that are stored on such a portable medium and input to the computer system 2100 via portable storage medium drive 2135.

In FIG. 21, the peripheral devices 2120 include any type of computer support device, such as an input/output (I/O) interface, to add functionality to computer system 2100. The peripheral devices also include input devices to provide a portion of a user interface and may include an alphanumeric keypad or a pointing device such as a mouse, a trackball, a stylus, or cursor direction keys. The I/O interface comprises conventional circuitry for controlling input devices and performing particular signal conversions upon I/O data. The I/O interface may include, for example, a keyboard controller, a serial port controller, and/or digital signal processing circuitry.

In FIG. 21, the graphics subsystem 2140 and the display 2185 provide output alternatives of the system. The graphics subsystem 2140 and display 2145 include conventional circuitry for operating upon and output ting data to be displayed, where such circuitry preferably includes a graphics processor, a frame buffer, and display driving circuitry. The display 2145 may include a cathode ray tube (CRT) display, a liquid crystal display (LCD), or other suitable devices. The display 2145 preferably can display at least 257 colors. The graphics subsystem 2140 receives textual and graphical information and processes the information for output to the display 2145. The display would be used to display the GUI of FIGS. 2-18, 20. A video card in the computer system 2100 also comprises a part of graphics subsystem 2140 and also preferably supports at least 257 colors. For optimal results in viewing digital images, the user should use a video card and monitor that can display the True Color (24 bit color) setting. This setting enables the user to view digital images with photographic image quality.

In FIG. 21, audio means 2125 preferably includes a sound card that receives audio signals from a peripheral microphone. In addition, audio means 2125 may include a processor for processing sound. The signals can be processed by the processor in audio means 2125 of computer system 700 and passed to other devices as, for example, streaming audio signals.

In some embodiments, programs for performing methods in accordance with exemplary embodiments of the invention are embodied as computer program products/mediums. These generally include a storage medium or medium having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card, smart card, and other medium.

Stored on one or more of the computer readable medium, the program includes software for controlling both the hardware of a general purpose or specialized computer or microprocessor. This software also enables the computer or microprocessor to interact with a human or other mechanism utilizing the results of exemplary embodiments of the invention. Such software includes, but is not limited to, device drivers, operating systems and user applications. Preferably, such computer readable medium further includes software for performing the methods described above.

In certain other embodiments, a program for performing an exemplary method of the invention or an aspect thereof is situated on a carrier wave such as an electronic signal transferred over a data network. Suitable networks include the Internet, a frame relay network, an ATM network, a wide area network (WAN), or a local area network (LAN). Those skilled in the art will recognize that merely transferring the program over the network, rather than executing the program on a computer system or other device, does not avoid the scope of the invention.

It will be understood that the above-described apparatus and the method therefrom are merely illustrative of applications of the principles of this invention and many other embodiments and modifications may be made without departing from the spirit and scope of the invention as defined in the claims.

What is claimed is:

1. A system comprising:
a hardware processor;
memory;
an incentive application storage configured to receive and store activity information of a first viewer from a first website of a first provider, the activity information of the first viewer indicating the first viewer's involvement with the first website, and to receive and store activity information of a second viewer from a second website of a second provider, the activity information of the second viewer indicating the second viewer's involvement with the second website, the activity information of the first viewer received from the first website using an application programming interface (API) operable by the hardware processor, and the activity information of the second viewer received from the second website using the API operable by the hardware processor; and
an incentive application engine operable by the hardware processor, the incentive application engine configured to:
retrieve the activity information of the first viewer and the activity information of the second viewer from the incentive application storage;
award first incentive information to the first viewer based on the retrieved activity information of the first viewer;
award second incentive information to the second viewer based on the retrieved activity information of the second viewer;
provide the first incentive information to a first incentive application embedded in the first website, the first incentive application being previously provided to the first website to allow embedding, the first incentive information to be displayed to the first viewer by the first website; and
provide the second incentive information to a second incentive application embedded in the second website, the second incentive application being previously provided to the second website to allow embedding, the second incentive information to be displayed to the second viewer by the second website, the first and second websites being provided by different computer systems.

2. The system of claim 1, wherein the first incentive information comprises first website offerings awarded to the first viewer based on the retrieved activity information of the first viewer.

3. The system of claim 1, wherein the first incentive information comprises points earned by the first viewer for activities associated with the first website.

4. The system of claim 1, wherein the incentive application engine is further configured to provide a leaderboard to the first website, the leaderboard having an order of a plurality of leaders, the order being based on activities associated with the first website, the leaderboard identifying the first viewer as one leader of the plurality of leaders, and a position of the first viewer in the order being displayed in the leaderboard based on the first incentive information awarded to the first viewer based on the activity information of the first viewer.

5. The system of claim 1, wherein the first incentive information comprises levels earned by the first viewer for activities associated with the first website.

6. The system of claim 1, wherein the first incentive information comprises achievements earned by the first viewer for activities associated with the first website.

7. The system of claim 1, wherein the first incentive information comprises an avatar which is a digital representation of the first viewer.

8. The system of claim 1, wherein the first incentive information comprises access to a virtual room which is customizable by the first viewer.

9. The system of claim 1, wherein the incentive application engine configured to provide the first incentive information to the first incentive application embedded in the first website comprises the incentive application engine configured to provide an API command to the first incentive application embedded in the first website.

10. The system of claim 1, wherein the first website and the second website are operated on separate computing devices.

11. The system of claim 1, wherein the first website and the second website are owned by the same owner.

12. A method comprising:
receiving and storing, at a network site, activity information of a first viewer from a first website of a first provider, the activity information of the first viewer indicating the first viewer's involvement with the first website, the activity information of the first viewer received from the first website using an application programming interface (API) operable at the network site;
awarding, by the network site, first incentive information to the first viewer based on the activity information of the first viewer;

providing the first incentive information to a first incentive application embedded in the first website, the first incentive application being previously provided to the first website to allow embedding, the first incentive information to be displayed to the first viewer by the first website using the first incentive application;

receiving and storing, at the network site, activity information of a second viewer from a second website of a second provider, the activity information of the second viewer indicating the second viewer's involvement with the second website, the activity information of the second viewer received from the second website using the API operable at the network site;

awarding, by the network site, second incentive information to the second viewer based on the activity information of the second viewer; and providing the second incentive information to a second incentive application embedded in the second website, the second incentive application being previously provided to the second website to allow embedding, the second incentive information to be displayed to the second viewer by the second website using the second incentive application, the first and second websites being provided by different computer systems.

13. The method of claim 12, wherein the first incentive information comprises first website offerings awarded to the first viewer based on the activity information of the first viewer.

14. The method of claim 12, wherein the first incentive information comprises points earned by the first viewer for activities associated with the first website.

15. The method of claim 12, further comprising providing a leaderboard to the first website, the leaderboard having an order of a plurality of leaders, the order being based on activities associated with the first website, the leaderboard identifying the first viewer as one leader of the plurality of leaders, and a position of the first viewer in the order being displayed in the leaderboard based on the first incentive information awarded to the first viewer based on the activity information of the first viewer.

16. The method of claim 12, wherein the first incentive information comprises levels earned by the first viewer for activities associated with the first website.

17. The method of claim 12, wherein the first incentive information comprises achievements earned by the first viewer for activities associated with the first website.

18. The method of claim 12, wherein the first incentive information comprises an avatar which is a digital representation of the first viewer.

19. The method of claim 12, wherein the first incentive information comprises a virtual room which is customizable by the first viewer.

20. The method of claim 12, wherein the first website and the second website are operated on separate computing devices.

21. The method of claim 12, wherein the first website and the second website are owned by the same owner.

22. A non-transitory computer readable medium comprising instructions, the instructions being executable by a hardware processor to perform a method, the method comprising:

receiving and storing, at a network site, activity information of a first viewer from a first website of a first provider, the activity information of the first viewer indicating the first viewer's involvement with the first website, the activity information of the first viewer received from the first website using an application programming interface (API) operable at the network site;

awarding, by the network site, first incentive information to the first viewer based on the activity information of the first viewer;

providing the first incentive information to a first incentive application embedded in the first website, the first incentive information to be displayed to the first viewer by the first website;

receiving and storing, at the network site, activity information of a second viewer from a second website of a second provider, the activity information of the second viewer indicating the second viewer's involvement with the second website, the activity information of the second viewer received from the second website using the API operable at the network site;

awarding, by the network site, second incentive information to the second viewer based on the activity information of the second viewer; and providing the second incentive information to a second incentive application embedded in the second website, the second incentive information to be displayed to the second viewer by the second website, the first and second websites being provided by different computer systems.

* * * * *